Figure 1:
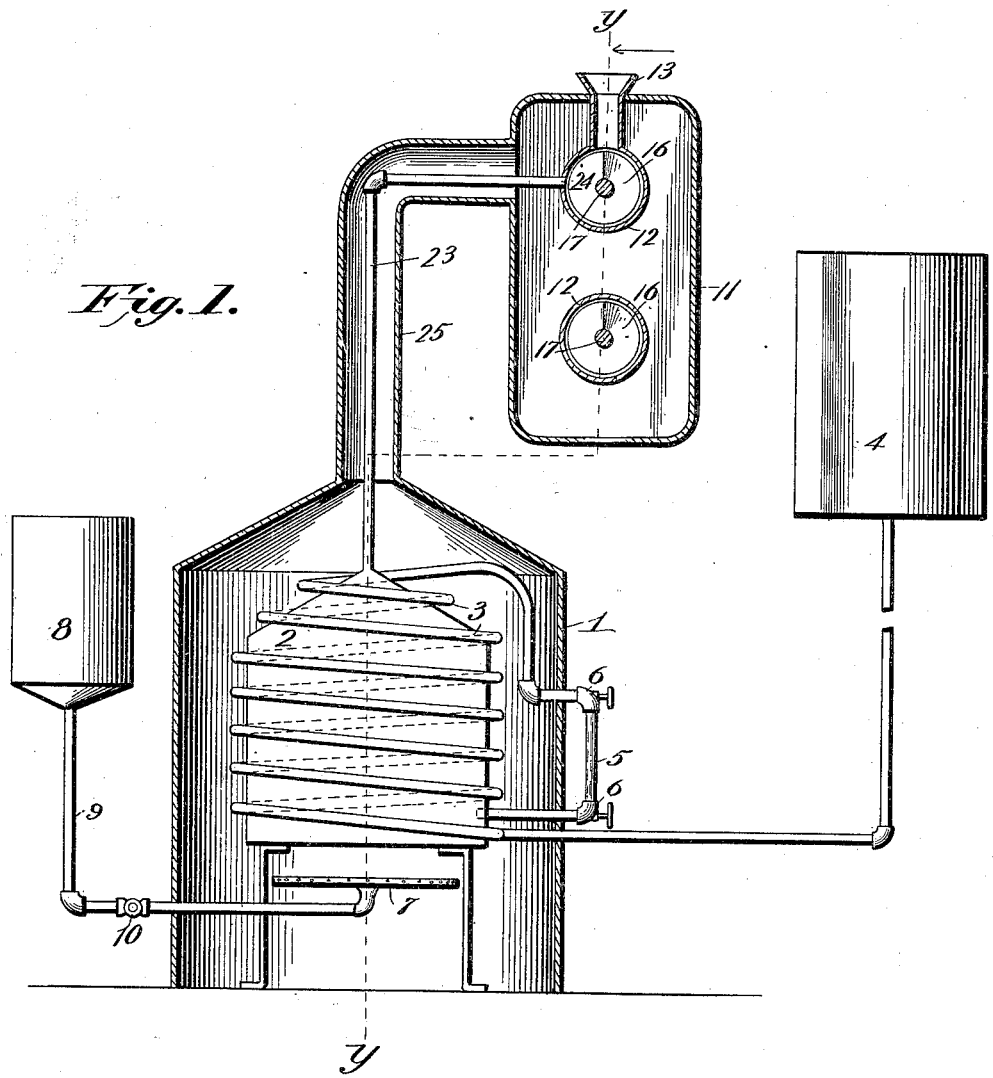

No. 701,322. Patented June 3, 1902.
J. FRANTZ.
WHEAT STEAMER.
(Application filed Sept. 20, 1901.)
(No Model.) 2 Sheets—Sheet 1.

WITNESSES:
INVENTOR.
Jacob Frantz,
BY Henry T. Bright
Attorney

No. 701,322. Patented June 3, 1902.
J. FRANTZ.
WHEAT STEAMER.
(Application filed Sept. 20, 1901.)
(No Model.) 2 Sheets—Sheet 2.
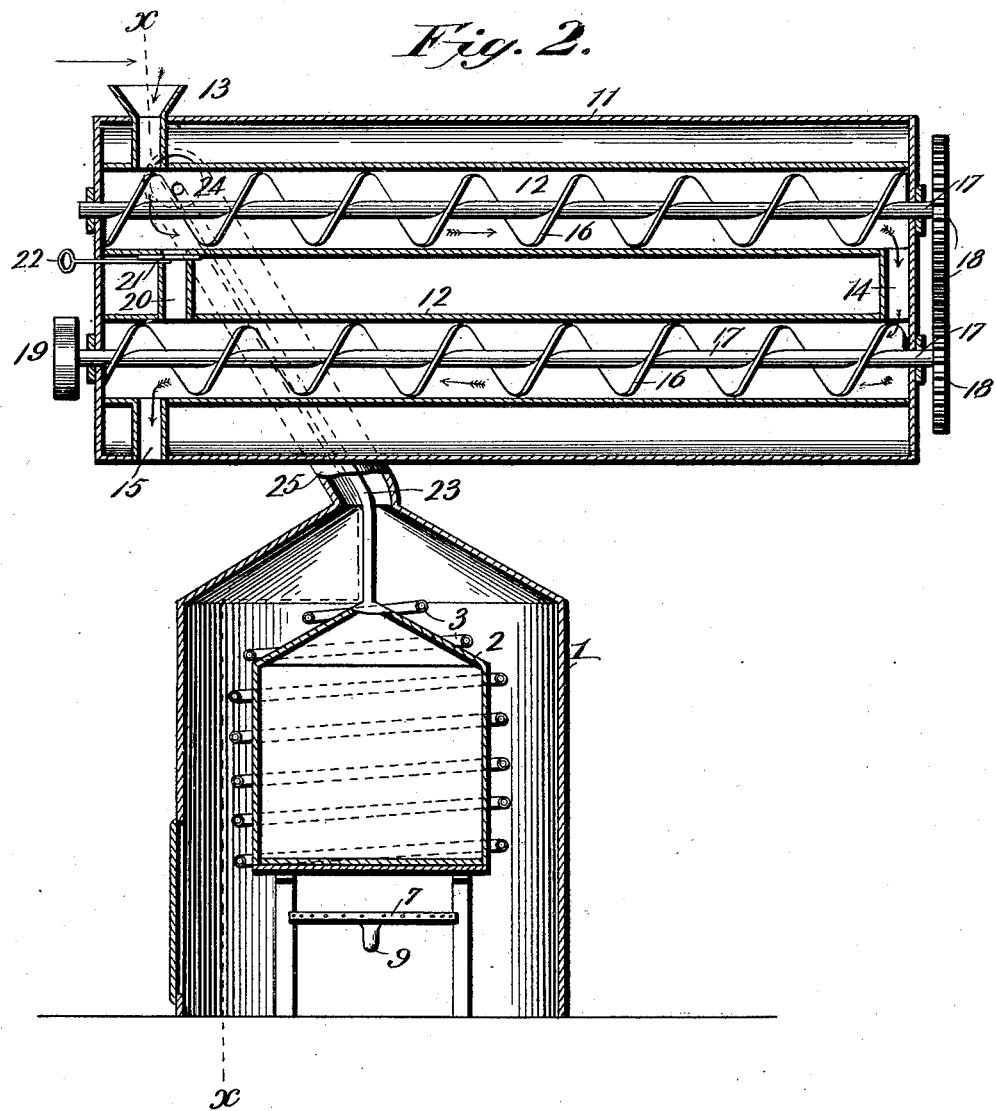
WITNESSES:
INVENTOR.
Jacob Frantz,
BY Henry T. Bright.
Attorney

UNITED STATES PATENT OFFICE.

JACOB FRANTZ, OF PHILADELPHIA, PENNSYLVANIA.

WHEAT-STEAMER.

SPECIFICATION forming part of Letters Patent No. 701,322, dated June 3, 1902.

Application filed September 20, 1901. Serial No. 75,727. (No model.)

*To all whom it may concern:*

Be it known that I, JACOB FRANTZ, a citizen of the United States, residing at Philadelphia, in the county of Philadelphia and State of Pennsylvania, have invented certain new and useful Improvements in Wheat-Steamers; and I do hereby declare the following to be a full, clear, and exact description of the invention, such as will enable others skilled in the art to which it appertains to make and use the same.

This invention relates to grain-steamers; and it has for its object, first, to produce a grain-agitator and in combination therewith a steaming attachment and means for preventing condensation of the steam as it circulates through the steaming-chambers; second, to produce a steamer and means for retaining the steam at a high temperature within the steaming-chamber, the said steam and its heating means being derived from a common source supplied simultaneously to the steaming-chambers and to the drum containing the said steaming-chambers.

Furthermore, the object of the invention is to produce a grain-steamer in which the grain may be conveyed throughout the length of the several chambers to effect a uniform action of the steam on all of the grain, or means may be provided for conveying the grain to the discharge-tube from the hopper in a more direct route when the prolonged action of the steam is unnecessary.

Furthermore, the object of the invention is to provide a steamer in which the products of combustion and heat derived therefrom are utilized to produce steam and at the same time for preventing condensation of the steam as it circulates through the steaming-chambers.
With the foregoing and other objects in view the invention comprises an apparatus in which the process of steaming grain may be carried on in an economical way, said apparatus proving efficient and satisfactory in use and comparatively inexpensive to produce and sustain.

In describing the invention in detail reference will be had to the accompanying drawings, forming part of this specification, in which like characters denote corresponding parts in the views, and in which—

Figure 1 is a sectional view of a steam generator and heater and the drum in connection therewith on a line corresponding with the line $x$ $x$ of Fig. 2. Fig. 2 is a sectional view taken on the line corresponding with the line $y$ $y$ of Fig. 1.

In the drawings, 1 indicates a heater-casing, and 2 a boiler therein encircled by a feed-water pipe 3, said feed-water pipe being in communication with the reservoir 4, from which a supply of water is derived. As stated, the feed-water pipe encircles the boiler, and the water therein is heated to a considerable degree before the water enters the boiler. A water-gage 5 is interposed in the feed-water pipe, and the valves 6 6 are used to control the flow of water to the boiler.

7 indicates a gasolene or other burner having a fuel-supply tank 8 in communication with it through the pipe 9, said pipe 9 having a suitable valve 10 for controlling the supply to the burner.

A drum 11 is supported in any suitable manner and has formed therein a series of steaming-chambers 12. A hopper 13 is in communication with the upper steaming-chamber at one end, and through it the grain to be operated upon is supplied. The chambers communicate at the opposite end through the down-spout 14, through which the grain passes from the upper to the lower steaming-chamber. A discharge-pipe 15 is located at the bottom of the second steaming-chamber in vertical alinement with the supply-pipe of the first-named steaming-chamber, so that the grain to be steamed must follow a circuitous route from the supply to the discharge pipe, and hence is uniformly treated in its passage. Screw conveyers 16 are mounted on shafts 17, journaled in the ends of the drums, said shafts being connected by gear-wheels 18, whereby they are driven in unison. The lower shaft is provided with a pulley 19, by which the shaft is driven from any suitable source of power.

In case the grain does not require the prolonged action of the steam I have provided a down-spout 20, leading from the upper to the lower chamber, said down-spout being stationed near the front of the drum. By this construction the grain can be conveyed from the supply-pipe to the discharge-pipe without traversing the great distance through the steaming-chambers, and it will be understood that a series of these spouts may be stationed throughout the length of the steaming-chambers in order that the time required for the passage of the grain through the chambers may be varied to suit the requirements or the conditions. The down-spout 20 is supplied with the controlling-slide 21, operated by the handle 22, so that the said down-spout may be opened or closed by the manipulation of the handle.

Steam is supplied to the chambers 12 by means of the pipe 23, which discharges into the upper steam-chamber at a point 24. The steam will follow the chambers and find its way to the discharge-pipe 15 into the atmosphere. The steam-pipe is surrounded by a second pipe 25, which communicates with the drum and discharges from the heater-casing 1. It will be observed that the heat from the pipe 25, passing into the drum, will retain the steam-chambers at a high temperature and prevent condensation of the steam, thereby increasing the efficiency of the apparatus with the consumption of a minimum of fuel.

Having thus described my invention, what I claim as new, and desire to secure by Letters Patent, is—

1. In a grain-steaming apparatus, a drum, steaming-chambers within the drum, means for conveying the grain through said chambers, a steam-generator, and means for conveying steam to the steam-chambers and the heat from the steam-generator to the drum, substantially as described.

2. In a grain-steaming apparatus, a drum, steaming-chambers within the drum, conveyers within the chambers, spouts between the chambers suitably controlled, a steam-generator, a steam-pipe, leading from the generator to the steaming-chambers, a pipe encircling the steam-pipe communicating with the drum, a burner for the steam-generator, and a water-pipe encircling the steam-generator and communicating with the interior thereof, substantially as described.

3. In a grain-steaming apparatus, a drum, steaming-chambers therein, a heater-casing, a boiler therein, a steam-pipe leading from the boiler to the steam-chambers, and a pipe leading from the heater-casing to the drum, inclosing the steam-pipe, substantially as described.

4. In a grain-steaming apparatus, a drum, steaming-chambers within the drum, screw conveyers in the steaming-chambers, shafts journaled in the drum-heads on which the screw conveyers are mounted, gear-wheels connecting the shafts, a pulley on one shaft from which motion is derived from any suitable source, a heating-casing, a boiler within the casing, a burner under the boiler, a feed-water pipe encircling the boiler and communicating with the interior thereof, a steam-pipe connected to the boiler and to one of the steaming-chambers, and a pipe inclosing the steam-pipe, connecting the heating-casing and the drum, whereby steam is conducted to the steaming-chambers and heat is carried to the drum simultaneously, as and for the purpose described.

In testimony whereof I affix my signature in presence of two witnesses.

JACOB FRANTZ.

Witnesses:
H. M. HOOVER,
E. J. FRANTZ.